US006281186B1

(12) United States Patent
Michaud et al.

(10) Patent No.: US 6,281,186 B1
(45) Date of Patent: Aug. 28, 2001

(54) CLEANING OR DRYING COMPOSITIONS BASED ON 43-10MEE, ON $CH_2Cl_2$, ON CYCLOPENTANE AND ON $CH_3OH$

(75) Inventors: Pascal Michaud, Saint Gratien; Jean-Jacques Martin, Bois Colombes, both of (FR)

(73) Assignee: Atofina (FR)

( * ) Notice: Subject to any disclaimer, the term of this patent is extended or adjusted under 35 U.S.C. 154(b) by 0 days.

(21) Appl. No.: 09/556,864

(22) Filed: Apr. 21, 2000

(30) Foreign Application Priority Data

Apr. 22, 1999 (FR) ........................................ 99 05132

(51) Int. Cl.[7] ........................ C09K 5/04; C11D 7/52

(52) U.S. Cl. ................................ 510/411; 510/408

(58) Field of Search .................. 134/42, 40; 252/67, 252/69; 510/408, 177, 412, 415, 175, 409, 411

(56) References Cited

U.S. PATENT DOCUMENTS

| | | | |
|---|---|---|---|
| 5,580,906 | 12/1996 | Merchant | 521/88 |
| 5,827,454 * | 10/1998 | Kenroh et al. . | |

FOREIGN PATENT DOCUMENTS

| | | | |
|---|---|---|---|
| WO 97/41189 | 4/1997 | (WO) | 5/4 |
| WO 97/45570 | 5/1997 | (WO) | 5/28 |

* cited by examiner

*Primary Examiner*—Yogendra N. Gupta
*Assistant Examiner*—Gregory E. Webb
(74) *Attorney, Agent, or Firm*—Smith, Gambrell & Russell, LLP

(57) ABSTRACT

In order to replace compositions based on CFC or on HCFC in cleaning or drying applications on solid surfaces (in particular defluxing), the invention provides azeotropic or near-azeotropic compositions based on 1,1,1,2,3,4,4,5,5,5-decafluoropentane, on dichloromethane, on cyclopentane and on methanol.

9 Claims, No Drawings

CLEANING OR DRYING COMPOSITIONS BASED ON 43-10MEE, ON $CH_2Cl_2$, ON CYCLOPENTANE AND ON $CH_3OH$

FIELD OF THE INVENTION

The present invention relates to the field of fluorinated hydrocarbons and has more particularly as subject-matter novel compositions which can be used for cleaning or drying solid surfaces.

BACKGROUND OF THE INVENTION 1,1,2-Trichloro-1,2,2-trifluoroethane (known in the trade under the name F113) has been widely used in industry for cleaning and degreasing highly-varied solid surfaces (metal components, glasses, plastics, composites) for which the absence or at least the lowest possible residual content of impurities, in particular of organic nature, is required. F113 was particularly well suited to this use because of its nonaggressive nature with regard to the materials used. This product was used in particular in the field of the manufacture of printed circuits , for removing the residues of the substances used to improve the quality of the soldered joints (denoted by the term solder flux). This removal operation is denoted in the trade by the term "defluxing".

Mention may also be made of the applications of F113 in the degreasing of heavy metal components and in the cleaning of mechanical components of high quality and of great accuracy, such as, for example, gyroscopes and military, aerospace or medical equipment. In its various applications, F113 is generally used in combination with other organic solvents (for example methanol), in order to improve its cleaning power. It is then preferable to use azeotropic or near-azeotropic mixtures. The term "near-azeotropic mixture" is understood to mean, within the sense of the present invention, a mixture of generally miscible chemical compounds which, under certain specific conditions of proportions, temperature and pressure, boils at a substantially constant temperature while retaining substantially the same composition. When it is heated to reflux, such a near-azeotropic mixture is in equilibrium with a vapour phase, the composition of which is substantially the same as that of the liquid phase. Such azeotropic or near-azeotropic behaviour is desirable in ensuring satisfactory operation of the devices in which the abovementioned cleaning operations are carried out and in particular in ensuring the recycling by distillation of the cleaning fluid.

F113 is also used in fields, in particular in optics, where it is required to have available surfaces which are devoid of water, that is to say surfaces where water is only present in the form of traces undetectable by the measurement method (Karl Fischer method). F113 is, for this purpose, employed in drying (or dewetting) operations on the said surfaces, in combination with hydrophobic surface-active agents.

However, the use of compositions based on F113 is now forbidden as F113 is one of the chlorofluorocarbons (CFCs) suspected of attacking or damaging the stratospheric ozone.

In these various applications, F113 can be replaced by 1,1-dichloro-1-fluoroethane (known under the name F141b), but the use of this substitute is already controlled because, although low, it still has a destructive effect with regard to ozone.

Application EP 0,856,578 discloses a composition, comprising from 10 to 90% by weight of 1,1,1,2,3,4,4,5,5,5-decafluoropentane, from 10 to 90% of dichloromethane and from 0 to 10% of methanol, which can also be used as substitute for F113. 1,1,1,2,3,4,4,5,5,5-Decafluoropentane, known in the trade under the name 43-10mee, also has no destructive effect with regard to ozone.

DETAILED DESCRIPTION OF THE INVENTION

The aim of the invention is to provide other compositions capable of being used as substitute for F113 or F141b and which have no destructive effect with regard to ozone.

In order to contribute to the resolution of this problem, the subject-matter of the present invention is therefore azeotropic or near-azeotropic compositions comprising:

- from 35 to 55% of 1,1,1,2,3,4,4,5,5,5-decafluoropentane, preferably from 40 to 50%,
- from 20 to 40% of dichloromethane, preferably from 25 to 35%,
- from 10 to 20% of cyclopentane, preferably from 15 to 20%, and
- from 0.5 to 10% of methanol, preferably from 1 to 5%.

Except when otherwise indicated, the percentages used in the present text to indicate the content of the compositions according to the invention are percentages by weight.

In this range, there exists an azeotrope, the boiling temperature of which is 31.4° C. at standard atmospheric pressure (1.013 bar).

The compositions according to the invention make it possible to obtain very good results in the cleaning and degreasing of solid surfaces, as well as in drying and dewetting operations on surfaces.

The compositions according to the invention can be easily prepared by simple mixing of the constituents. 43-10mee is commercially available.

As in the known cleaning compositions based on F113 or F141b, the cleaning compositions based on 43-10mee, on dichloromethane, on cyclopentane and on methanol according to the invention can, if desired, be protected against chemical attacks resulting from their contact with water (hydrolysis) or with light metals (constituting the solid surfaces to be cleaned) and/or against radical attacks capable of taking place in cleaning processes by adding a conventional stabilizer thereto, such as, for example, nitroalkanes (in particular nitromethane, nitroethane or nitropropane), acetals (dimethoxymethane) or ethers (1,4-dioxane or 1,3-dioxolane). The proportion of stabilizer can range from 0.01 to 5% with respect to the total weight of the composition. It is preferable to use dimethoxymethane as stabilizer, the boiling point of dimethoxymethane being close to that of the azeotropic compositions according to the invention; for this reason, this stabilizer conforms perfectly to the cycle of evaporation and condensation of the solvent, which is particularly advantageous in cleaning applications.

The compositions according to the invention can be mixed with other solvents, such as alcohols, ketones, ethers, acetals, esters, hydrocarbons, chlorinated, brominated or iodinated solvents, sulphones or water, in the presence of (anionic, nonionic or cationic) surfactants which comprise fluorine or silicone, or not, in order to obtain specific properties, in particular in dry-cleaning.

The compositions according to the invention can be used in the same applications and be employed according to the same methods as the prior compositions based on F113 or F141b. They are therefore particularly suitable for use in the cleaning and degreasing of solid surfaces, preferably in the defluxing of printed circuits, as well as in drying operations on surfaces.

As regards the latter use, it is preferable to add a soluble hydrophobic surfactant to the composition, in order to further improve the removal of water from the surfaces to be treated, until 100% removal is achieved.

Among hydrophobic surfactants, the diamides of formula:

$$R—CO—NR—(CH_2)_n—NH—CO—R \quad (I)$$

in which R is an alkyl radical comprising from 14 to 22 carbon atoms, preferably from 16 to 20 carbon atoms, and n is an integer between 1 and 5 inclusive, preferably equal to 3.

According to this preferred alternative form of the compositions according to the invention, the composition generally comprises from 92 to 99.5% of the quaternary azeotropic composition and from 0.05 to 8% of surfactant.

As regards the forms of use of the compositions according to the invention, mention may particularly be made of the use in devices suitable for the cleaning and/or drying of surfaces, as well as by aerosol.

As regards the aerosol use, the compositions according to the invention can be packaged with, as propellant, 134a (or 227e of formula $CF_3CHF—CF_3$) and their mixture with 152a and/or DME (dimethyl ether), in order to offer additional cleaning possibilities, in particular at room temperature. The compositions according to the invention, thus packaged, do not exhibit a flame length according to Standard 609F of the Fédération Européenne des Aérosols [European Aerosol Federation] (Brussels, Belgium) (Determination of the ignition distance of a spray or of a stream emitted from an aerosol container).

These compositions can, in addition, be used as a blowing agent for polyurethane foams, as an agent for the dry-cleaning of textiles and as a refrigerating medium.

EXAMPLES

The following example illustrates the invention without limiting it.

Example 1 a) Demonstration of a 43-10mee/dichloromethane/cyclopentane/methanol azeotrope:

70 g of 43-10mee and 70 g of methylene chloride, 30 g of cyclopentane and 10 g of methanol are introduced into the boiler of a distillation column (30 plates). The mixture is subsequently heated at reflux for one hour in order to bring the system to equilibrium.

When the temperature is observed to be stationary, a fraction weighing approximately 20 g is collected. This fraction, as well as the bottom fraction remaining in the boiler, are analysed by gas chromatography.

Examination of the results recorded in the table below indicates the presence of an azeotropic composition.

| | Composition (weight %) | | | |
|---|---|---|---|---|
| | 43-10mee | $CH_2Cl_2$ | cyclopentane | $CH_3OH$ |
| starting mixture | 38.9 | 38.9 | 16.5 | 5.5 |
| Fraction collected at 31.4° C. | 47.5 | 32.7 | 17 | 2.8 |

b) Confirmation of the azeotropic composition:

200 g of a mixture comprising 47.5% of 43-10mee, 32.7% of $CH_2CL_2$, 17% of cyclopentane and 2.8% of MeOH are introduced into the boiler of a distillation column (30 plates). The mixture is subsequently heated at reflux for one hour in order to bring the system to equilibrium.

A fraction weighing approximately 20 g is withdrawn and is analysed by gas chromatography.

Examination of the results recorded in the following table indicates the presence of a 43-10mee/$CH_2CL_2$/cyclopentane/$CH_3OH$ quaternary azeotrope, since the fraction collected has the same composition as the starting mixture. It is a positive azeotrope, since its boiling point is lower than that of each of the pure products, i.e. 55° C. for 43-10mee, 40° C. for $CH_2CL_2$, 32° C. for cyclopentane and 65° C. for $CH_3OH$.

| | Composition (weight %) | | | |
|---|---|---|---|---|
| | 43-10mee | $CH_2Cl_2$ | cyclopentane | $CH_3OH$ |
| starting mixture | 47.5 | 32.7 | 17 | 2.8 |
| Fraction collected at 31.4° C. | 47.5 | 32.7 | 17 | 2.8 |

Example 2

Cleaning of solder flux

The following test is carried out on five test circuits in accordance with Standard IPC-B-25 described in the manual of the test methods of the IPC (Institute for Interconnecting and Packaging Electronic Circuits; Lincolnwood, Ill., USA). These circuits are coated with solder flux based on colophony (product sold by the Company Alphametal under the name flux R8F) and are reflowed in an oven at 220° C. for 30 seconds.

To remove the colophony thus reflowed, these circuits are cleaned using the azeotropic composition of Example 1 in a small ultrasonic device, for 3 minutes by immersion in the liquid phase and 3 minutes in the vapour phase.

The cleaning is evaluated according to the standardized procedure IPC 2.3.26 (also described in the abovementioned manual) using an accurate conductivity meter. The value obtained is below the threshold for ionic impurities tolerated by the profession (2.5 $\mu g/cm^2$ eq. NaCl).

Example 3

Surface drying 250 ml are prepared of a drying composition comprising 99.8% of the composition described in Example 1, to which is added 0.2% of dioleyloleylamido)propyleneamide (compound of formula (I) in which R is an alkyl radical comprising an average of 18 carbon atoms and n is equal to 3).

A stainless steel mesh with dimensions of 5×3 cm is dipped in water for a few seconds.

The water-retaining ability of this mesh is measured by dipping the mesh in absolute ethyl alcohol and then quantitatively determining by the Karl Fischer method employed with this alcoholic solution.

This mesh is subsequently immersed for 30 seconds in the drying composition thus prepared, with manual stirring. The mesh is removed from this composition and the residual water is quantitatively determined by means of the Karl Fischer method, as described above.

The amount of residual water after drying, divided by the water-retaining ability of the mesh (corrected for the water content of the absolute ethyl alcohol used), is known as the degree of removal (expressed as a percentage).

A degree of removal of the water equal to 100% is measured.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Azeotropic or near-azeotropic compositions comprising:

from 35 to 55% of 1,1,1,2,3,4,4,5,5,5-decafluoropentane, from 20 to 40% of dichloromethane, from 10 to 20%, of cyclopentane, and from 0.5 to 10% of methanol.

2. Composition according to claim 1 in the form of an azeotrope, wherein the boiling temperature is 31.4° C. at standard atmospheric pressure.

3. Compositions according to claim 1, further comprising a stabilizer.

4. Compositions according to claim 1, further comprising a soluble hydrophobic surfactant.

5. Method for cleaning and degreasing of solid surfaces, including defluxing of printed circuits, and in drying operations on surfaces comprising treating the surface with the composition according to claim 1.

6. Azeotropic or near-azeotropic compositions according to claim 1, wherein the amount of decafluoropentane is from 40 to 50%, dichloromethane, is from 25 to 35%, cyclopentane is from 15 to 20%, and methanol is from 1 to 5%.

7. Compositions according to claim 3, wherein the stabilizer is dimethoxymethane.

8. Compositions according to claim 4, wherein the surfactant is a diamide of formula:

$$R—CO—NR—(CH_2)_n—NH—CO—R \quad (I)$$

in which R is a alkyl radical comprising from 14 to 22 carbon atoms, and n is an integer between 1 and 5 inclusive.

9. Compositions according to claim 8, wherein R contains from 16 to 20 carbon atoms and n is equal to 3.

* * * * *